(12) United States Patent
Fuetterer

(10) Patent No.: US 7,866,727 B2
(45) Date of Patent: Jan. 11, 2011

(54) SEALING STRIP FOR SIDE WINDOWS ON MOTOR VEHICLES

(75) Inventor: Michael Fuetterer, Hildrizhausen (DE)

(73) Assignee: Daimler AG, Stuttgart (DE)

( * ) Notice: Subject to any disclaimer, the term of this patent is extended or adjusted under 35 U.S.C. 154(b) by 476 days.

(21) Appl. No.: 11/661,289

(22) PCT Filed: Aug. 23, 2005

(86) PCT No.: PCT/EP2005/009080

§ 371 (c)(1),
(2), (4) Date: Jul. 10, 2008

(87) PCT Pub. No.: WO2006/024427

PCT Pub. Date: Mar. 9, 2006

(65) Prior Publication Data

US 2009/0001755 A1    Jan. 1, 2009

(30) Foreign Application Priority Data

Aug. 28, 2004 (DE) .................. 10 2004 041 741

(51) Int. Cl.
*B60J 1/00* (2006.01)
(52) U.S. Cl. .............. 296/146.2; 296/146.9; 296/146.1
(58) Field of Classification Search ............ 296/146.15, 296/152, 154, 146.16, 146.2, 93; 49/394, 49/475.1, 489.1, 404; 292/14, 32, 38, 42, 292/137, 145, 146, 150, DIG. 21, DIG. 70; 277/921, 645

See application file for complete search history.

(56) References Cited

U.S. PATENT DOCUMENTS

| | | | | |
|---|---|---|---|---|
| 188,041 A | * | 3/1877 | Burtis | .......................... 292/151 |
| 1,414,862 A | * | 5/1922 | Colavita | ........................ 70/210 |
| 2,174,231 A | * | 9/1939 | Vandeveld | ..................... 292/34 |
| 2,438,238 A | * | 3/1948 | Tonkin | ......................... 292/182 |
| 2,613,617 A | * | 10/1952 | Dean | ............................ 105/429 |
| 3,603,636 A | * | 9/1971 | Carella et al. | ................ 296/218 |
| 4,367,454 A | * | 1/1983 | Modica | .................. 340/426.34 |
| 4,815,773 A | * | 3/1989 | Merrell | ......................... 292/60 |
| 5,414,961 A | * | 5/1995 | Tessier | ......................... 49/441 |
| 5,755,467 A | * | 5/1998 | Dilluvio et al. | ............... 292/32 |
| 5,931,523 A | * | 8/1999 | Kreye | ...................... 296/146.15 |
| 6,053,565 A | * | 4/2000 | Cho | ....................... 296/187.12 |

(Continued)

FOREIGN PATENT DOCUMENTS

DE    42 03 364 A1    8/1993

(Continued)

OTHER PUBLICATIONS

International Search Report dated Nov. 24, 2005, including PCT/ISA/220 and PCT/ISA/237 with English translation of relevant portion (Twelve (12) pages).

*Primary Examiner*—Dennis H Pedder
*Assistant Examiner*—Pinel E Romain
(74) *Attorney, Agent, or Firm*—Crowell & Moring LLP

(57) ABSTRACT

A sealing strip for side windows on motor vehicles, which is arranged between a retractable, frameless, front side window and a retractable, frameless, rear side window. The sealing strip reaches from the door line as far as a roof frame of the motor vehicle. A movable locking member is fitted to the sealing strip and, in a closed state, engages with a locking counterpart arranged on the roof frame.

20 Claims, 3 Drawing Sheets

U.S. PATENT DOCUMENTS

| | | | |
|---|---|---|---|
| 6,208,497 B1 * | 3/2001 | Seale et al. | 361/160 |
| 6,723,414 B2 * | 4/2004 | Aritake et al. | 428/122 |
| 7,073,294 B2 * | 7/2006 | Yamaoka et al. | 49/479.1 |
| 2003/0168882 A1 * | 9/2003 | Naito et al. | 296/146.2 |

FOREIGN PATENT DOCUMENTS

| | | |
|---|---|---|
| DE | 100 55 897 C1 | 12/2001 |

* cited by examiner

SEALING STRIP FOR SIDE WINDOWS ON MOTOR VEHICLES

BACKGROUND AND SUMMARY OF THE INVENTION

This application claims the priority of German patent document 10 2004 041 741.5, filed Aug. 28, 2004 (PCT International Application No. PCT/EP2005/009080, filed Aug. 23, 2005), the disclosure of which is expressly incorporated by reference herein.

The invention relates to a sealing strip for side windows on a motor vehicle.

For sporty motor vehicles constructed in coupe form, it is frequently desirable, for design reasons, for the front and rear side windows to meet as closely to each other as possible. In particular, when a B-pillar in the region between the door line and the roof frame is dispensed with in the construction of the vehicle, guiding the side windows firmly in the roof frame at higher speeds is frequently problematic.

German patent document DE 42 03 364 C2 illustrates a motor vehicle coupe which has a front and a rear side window, and the rear side window retracts in the rear door line of the vehicle. (No rear door is provided.) A sealing strip, which is fastened to the rear side window and which has a seal for receiving the front side window, is fitted between the front and the rear side. In the closed state, both the front and the rear side windows, which are moreover configured without a door frame, are sealed by the sealing strip and by a seal in the roof frame. In this case, however, the rear side window is relatively short. In the case of four-door vehicles, with correspondingly long rear side windows, this sealing arrangement may, under some circumstances, no longer be sufficient, in particular at high speeds, in order to satisfy the demands in terms of comfort with regard to wind noises.

One object of the invention is to provide a seal for side windows on vehicles of the abovementioned type, in which wind noise is reduced in comparison to the prior art.

This and other objects and advantages are achieved by the sealing strip according to the invention, which is arranged between a retractable, frameless, front side window and a retractable, frameless, rear side window. The sealing strip reaches from a door line as far as a roof frame of the motor vehicle, and has a movable locking means fitted to it. In a closed state, the locking means engages with a locking counterpart arranged on the roof frame, so that the side window, to which the sealing strip is fastened by locking means, is locked fixedly to the roof frame of the vehicle. As a result, the tensile force, which acts on the side windows (in particular at high speeds) and pushes said windows outward, is absorbed by the locking means, and wind is reduced.

In one embodiment, the sealing strip is fastened to the rear side window on a side which faces the front side window. The sealing strip is therefore fastened to the rear side window between the rear side window and the front side window. This affords the advantage that a front door can be opened without first having to open the rear door. In particular in the case of long rear side windows, it is advantageous to allow the locking means to act on the rear side window.

Conversely, however, it may also be expedient to fasten the sealing strip with the locking means to the front side window on a side which faces the rear side window. No difference can be ascertained in this case by a person looking at it from the outside. This variant may be expedient when the front side window is significantly longer than the rear side window.

When the sealing strip is fastened to one of the two side windows, it is expedient for the sealing strip to have, in its cross section, a U-profile. This U-profile can be placed longitudinally around and adhesively bonded to the side window. In this case, it may also be expedient to arrange a limb on the U-profile of the sealing strip, which limb likewise serves in its longitudinal extent on the sealing strip to receive a further seal. The further seal in turn seals the side window, which is not connected to the sealing strip by adhesive bonding.

In another embodiment, it may be expedient to configure the sealing strip in the form of an H-profile. The H-profile equally surrounds the two side windows that meet each other (the front side window and the rear side window). This arrangement has the advantage that the two side windows are held in the roof frame by the locking of the sealing strip. However, this requires a more complicated mechanism for opening the individual doors.

In one embodiment, the locking means is configured in the form of a locking pin running along the sealing strip. In this case, "pin" is understood as meaning an elongate object which can have any desired cross section. Moreover, it is also possible for its cross section to change over its length. This locking pin is furthermore preferably arranged in a hollow cross section in the sealing strip, with the hollow cross section of the sealing strip serving over its length as a guide for the locking pin. Apart from the secure guidance, this arrangement of the locking pin also has the advantage that it is not visible from the outside, which is advantageous visually.

In one embodiment of the invention, the locking pin engages, in a state of flow, in an opening in the roof frame. In this case, the opening in the roof frame preferably has the same cross section as the locking pin. The opening may optionally be reinforced by reinforcing sleeves or plates.

For safety reasons, it is expedient that an automatic unlocking of the locking means takes place in the event of an accident and/or in the event of a failure of the vehicle power supply and/or in the event of a malfunction of onboard electronics. Such automatic unlocking in the event of an emergency is possible, in particular, by the use of an electromagnetic or an electropneumatic actuating device for the locking means.

In a further embodiment of the invention, it is expedient that guide rails for the side windows (i.e., for the front side window and for the rear side window) are arranged in an angled manner with respect to the sealing strip such that, when a window is opened, the opening is immediately drawn away from its boundary line with the other window. This prevents tilting during opening of the doors and windows.

Other objects, advantages and novel features of the present invention will become apparent from the following detailed description of the invention when considered in conjunction with the accompanying drawings.

DETAILED DESCRIPTION OF THE DRAWINGS

Figure 1:
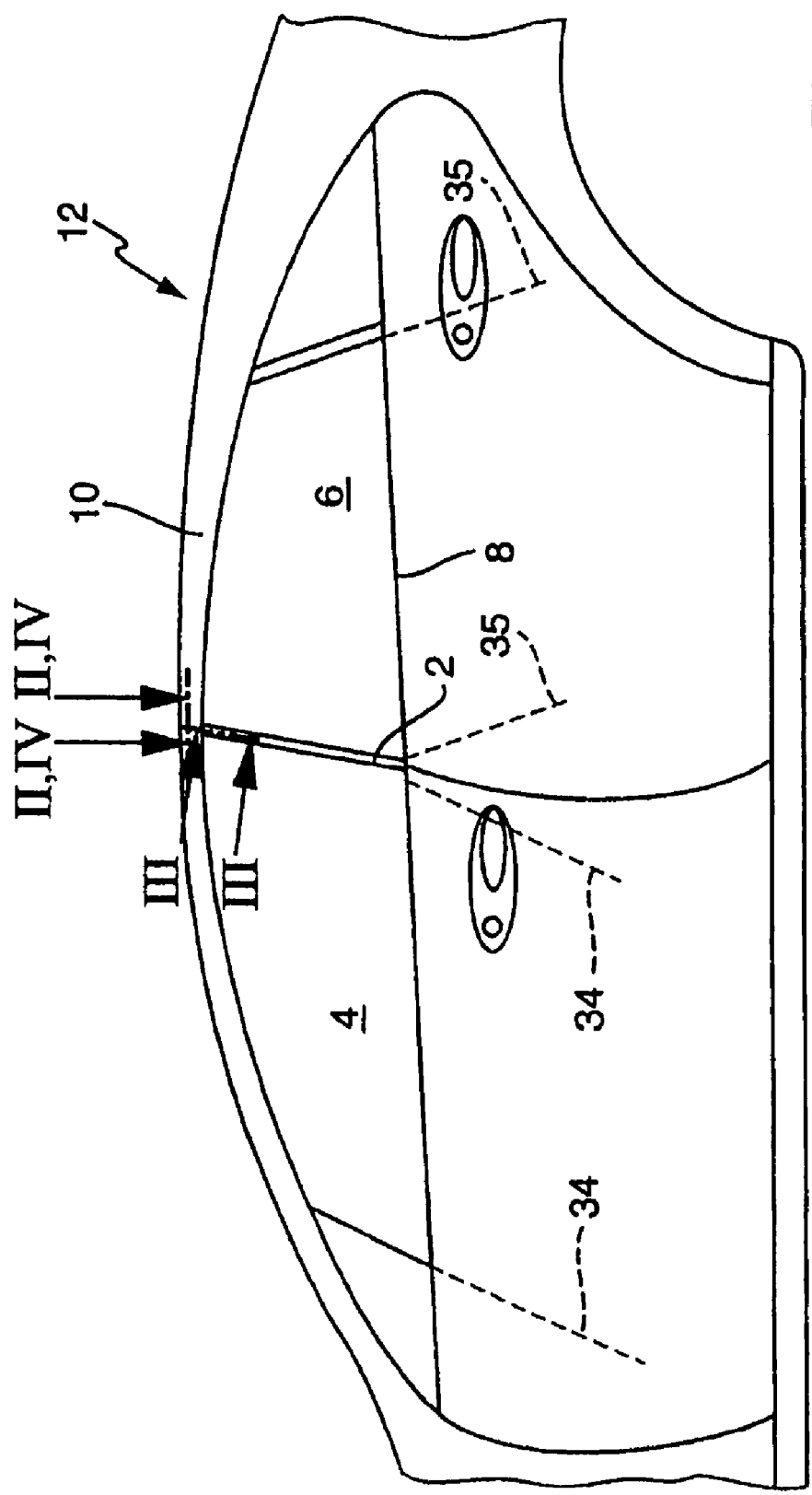
FIG. 1 is a cut-out side view of a motor vehicle with a front side window and a rear side window which are separated by a sealing strip.

FIG. 1 illustrates the side view of a motor vehicle 12, wherein a front side window 4 fitted in a front door meets a rear side window 6 that is fitted in a rear door. This vehicle does have a B-pillar (not visible in FIG. 1), to which door hinges for the rear door and closing mechanisms for the front door are fastened. The B-pillar reaches only as far as a door line 8. Above the door line 8 there is no B-pillar to support the side windows 4 and 6.

Figure 2:
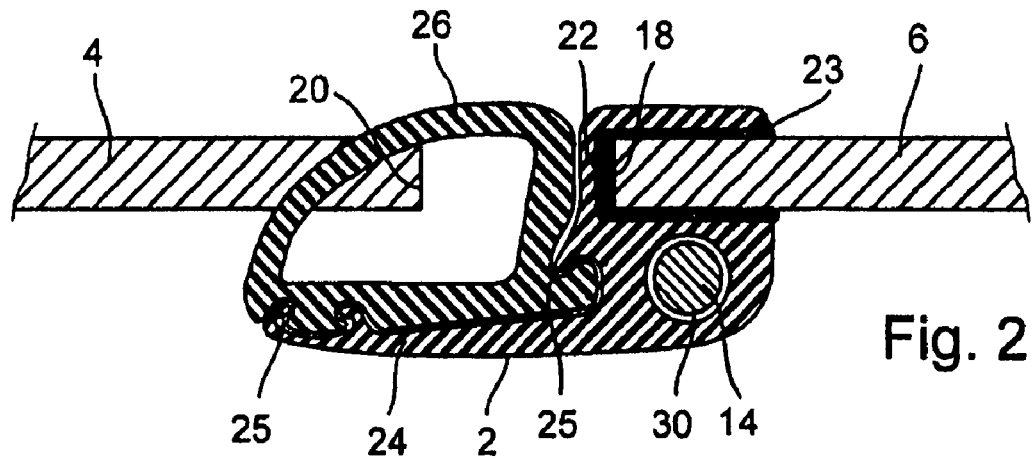
FIG. 2 is a cross sectional view through the sealing strip, taken along the section line II in FIG. 1.

In this embodiment, the side windows 4 and 6 are frameless and are separated from each other by a sealing strip 2, as illustrated in FIG. 2 through the cross section along the section line 2 in FIG. 1. In this embodiment, the sealing strip 2 at the front 18 of the window 6 is surrounded by a U-profile 22 which, in turn, constitutes a cross-sectional region of the sealing strip. A bonded seam 23, which fastens the sealing strip to the rear side window 6 in region 18, runs between the U-profile 22 and the rear window 6. The U-profile 22 could also be fastened to the region 20 of the front side window 4.

Starting from the U-profile 22, the sealing strip 2 has a limb 24 which in turn is provided with a plurality of undercuts 25 at which a seal 26 is clamped. In the closed state of the side windows 4 and 6, the front side window 4 bears against the seal 26. The limb 24 is arranged in such a manner that it forms an "L" in cross section with the lower part of the U-profile 22.

Figure 3:
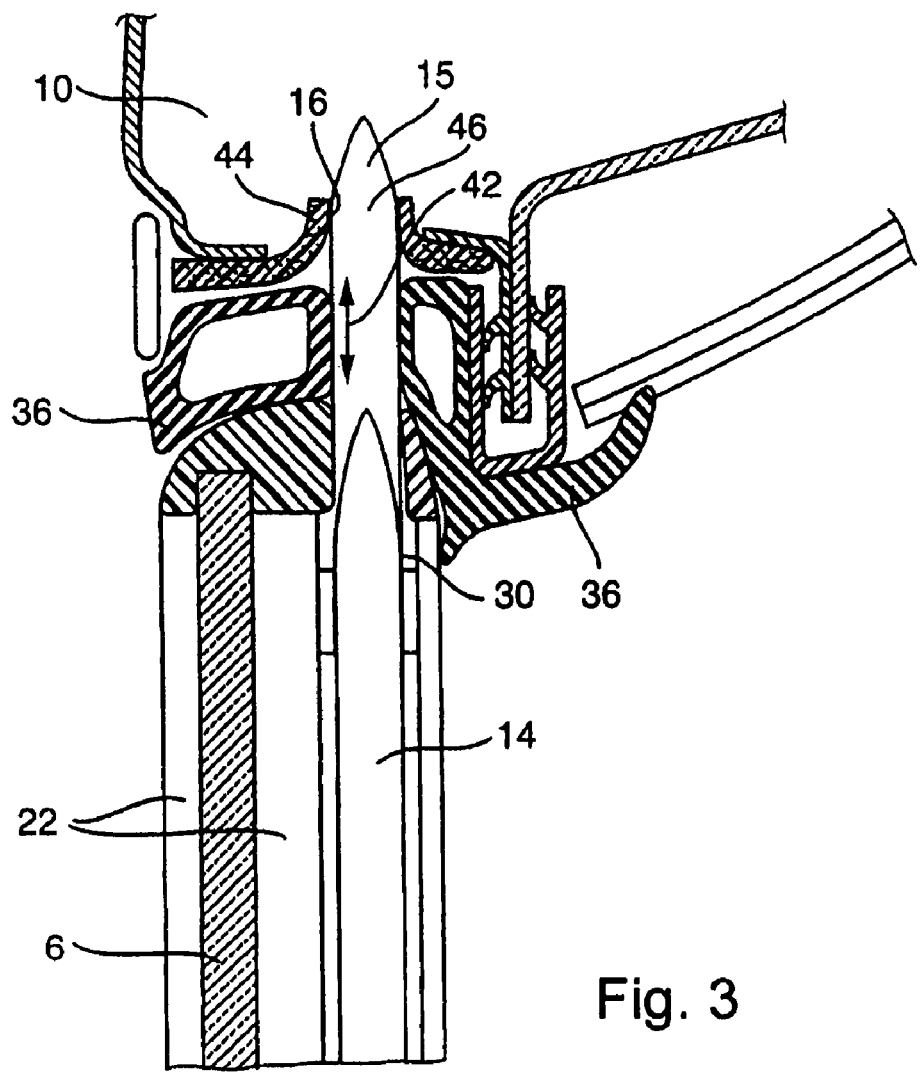
FIG. 3 is a longitudinal sectional view along the sealing strip, taken along the section line III in FIG. 1.

The sealing strip 2 has a hollow cross section 30, in which a locking means in the form of a locking pin 14 is guided. The hollow cross section 30 extends along the sealing strip 2 and therefore forms a hole along the sealing strip 2. FIG. 3 illustrates the manner in which the locking pin 14 is guided in the hollow cross section 30 of the sealing strip 2. FIG. 3 shows a rear side window 6 which is surrounded by the U-profile 22. The hollow cross section 30 with the locking pin 14 is arranged in the inner region of the sealing strip 2. In the closed state, the window 6 bears against a seal 36 in the roof frame 10 and is also guided in the roof frame region by said seal.

The arrow 42 illustrates the direction of movement of the locking bolt 14. The latter moves along the hollow cross section 30 through an opening 16 in the roof frame and therefore latches/locks the sealing strip 2, which in turn is fastened to the side window 6, to the roof frame 10 (locking position 46). To make the locking stronger, the opening 16 is reinforced by a reinforcing sleeve 44 or is formed by the latter. The locking pin 14 has a conically tapering point 15 to make it easier to insert into the opening 16.

Although the locking pin 14 may have various cross sections, a round cross section is expedient in practice. In addition to the locking pin 14 described, other locking means may also be expedient. For example, a hook which engages in an eyelet on the roof frame through a flap mechanism may be arranged on the sealing strip 2. However, the locking pin 14 described in more detail here can be mechanically actuated in a simple manner and its configuration is cost-effective. Similarly from the point of view of cost, the sealing strip is preferably produced by an aluminum extruded profile. Other production processes, such as deformation of sheet metal, are likewise conceivable in order to produce the sealing strip 2.

Figure 4:
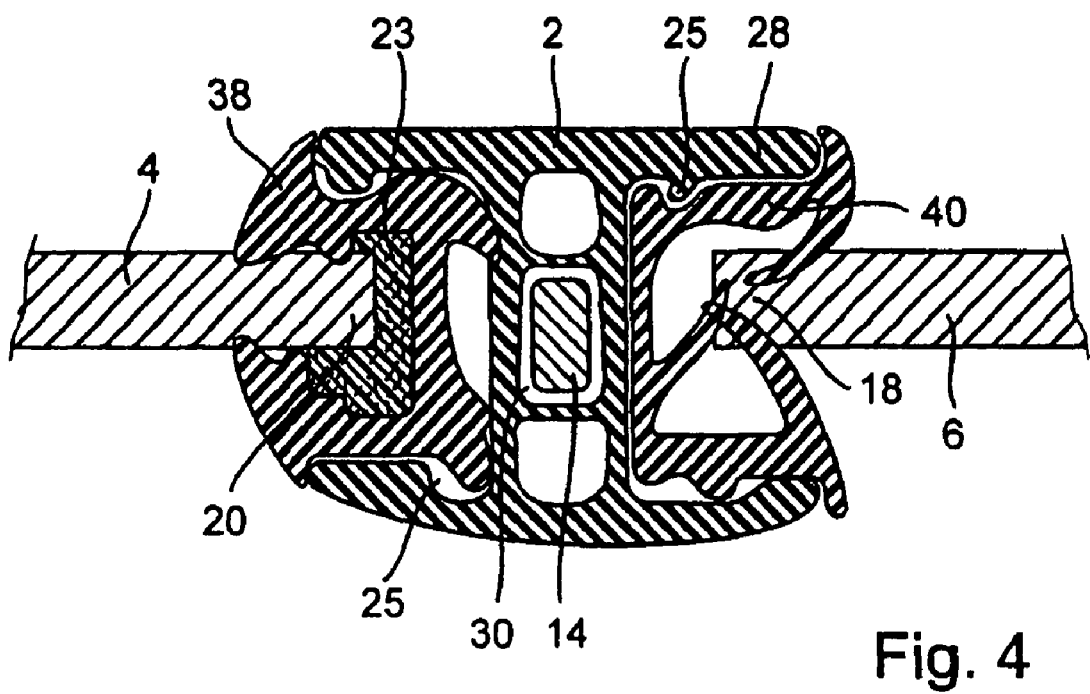
FIG. 4 is a cross sectional view through a sealing strip, taken along the section IV from FIG. 1.

In a further embodiment of the invention according to FIG. 4, the sealing strip 2 is configured in the form of an H-profile 28. Contrary to FIG. 2, not only is a side window therefore surrounded by a U-profile, but both the front side window 4 and the rear side window 6 are embedded by a U-profile, with the two U-profiles together forming an H-profile 28. In this embodiment, the front side window 4 is adhesively bonded in the region 20 into a seal 38 which, in turn, is fastened to the sealing strip 2 by undercuts 25. In contrast to FIG. 2, in this embodiment the sealing strip is therefore connected fixedly to the front side window 4 whereas the rear side window 6 engages freely in the seal 40 of the H-profile 28 and can be released therefrom.

The sealing strip 2 in FIG. 4 also has a hollow cross section 30 which, in this embodiment, is arranged in the web of the "H". A locking pin 14, which in this exemplary embodiment has a rectangular cross section with rounded edges, is likewise guided into this hollow cross section 30.

To actuate the locking means in this example of the locking pin 14, basically all suitable devices may be used. Electromagnetic and electropneumatic drives have proven advantageous. In this connection, an electromagnetic drive has the advantage that the build-up of compressed air can be omitted. In order to realize the driving device, it is possible, for example, for a solenoid (not illustrated here) to be arranged on the roof frame.

By overcoming a spring mechanism (not shown), in a closed state of the side windows the solenoid draws the locking pin 14 into the opening 30 of the roof frame, overcoming the spring force. As long as voltage is applied to the solenoid, the locking pin 14 is held in the locking position 46. The sealing strip 2 is therefore locked fixedly to the roof frame. This latching/locking counteracts the tendency of the side windows to be drawn outward at high travel speeds by the negative pressure formed by the slipstream, thereby achieving a sustained reduction of the wind noises.

In order to secure the occupants in the event of an accident, when an accident occurs, the voltage is withdrawn from a locking actuating means (for example the solenoid), and the latter releases the locking pin 14. The locking pin 14 is pushed back into the hollow cross section 30 of the sealing strip 2 via the spring force. The locking is therefore undone and the door can be opened freely. In this case, it is expedient for crash sensors, which are present in the vehicle and are provided for controlling airbags, to likewise take on control of the unlocking operation. It can therefore be ensured that, in the event of a crash, unlocking reliably takes place. It would thus also be guaranteed that unlocking of the locking means would take place in other emergency situations, for example in the event of failure of the vehicle electric system or in the event of a power failure.

For advantageous opening of the windows 4, 6 or of the associated doors of the motor vehicle, the guide rails 34 (FIG. 1) are arranged such that the side windows 4, 6 are first of all drawn away from each other during the opening of the windows. Tilting between the two side windows 4, 6 can thereby be prevented. The guide rails 34 in the front door are therefore arranged in the direction of the front side of the vehicle at an obtuse angle to the sealing strip 2. When the front side window 4 is retracted, the latter is easily drawn toward the front of the vehicle, and is therefore moved away from the rear side window 6. Analogously the guide rails 35 draw the rear side window 6 toward the rear of the vehicle in order to prevent its tilting with the front side window 4 as it is being retracted.

During opening and closing of the doors and of the side windows 4, 6, it may be expedient, under some circumstances, to set a "short-travel control" of the side windows 4, 6. In this case, for example when the door handle is actuated, an individual side window or both side windows 4, 6, depending in each case on requirements and design, may be briefly retracted to a certain degree in order, for example, to prevent locking or tilting of the sealing strip 2. Furthermore, after the end of the opening or closing operation, the side windows 4, 6 may be immediately moved back again into their starting position. Short-travel opening and closing operations of this type take place in a pre-programmed manner when the unlatching or latching of the vehicle doors 5, 8 is actuated.

A short-travel control of this type may be advantageous, particularly for the sealing strip according to FIG. 4, since here, in contrast to the sealing strip according to FIG. 2, both side windows 4, 6 are locked by the sealing strip in conjunction with the locking means. The sealing strip according to FIG. 4 requires a higher mechanical outlay for the opening of the windows and for the opening of the doors, but the windows are particularly readily locked to the vehicle body by this arrangement, which especially assists the reduction of wind noises. This arrangement is expedient in particular in the case of very long, large and heavy side windows 4, 6. Although the sealing strip according to FIG. 4 can be configured to be narrow, it is visible from the outside, which is not always desirable for design reasons. The sealing strip 2 according to FIG. 2 is scarcely visible from the outside and it permits easy closing and opening of the doors 5, 7 and of the side windows 4, 6.

In general, the front side window 4 can also be guided sufficiently readily in seals which are arranged in the roof frame of the motor vehicle. Frequently, therefore, no further latching is required for the front side window 4. However, should such latching nevertheless be necessary in an individual case, a further locking means can be provided which also locks the side window, to which the sealing strip 2 is not fastened. Such a locking means can be configured, for example, in the form of a flat, sheet-like locking bolt which, in the upper region of the side window concerned, is pushed from the sealing strip 2 or from the roof frame 10 over the side window 4 or 6 concerned with a short region of overlap. Also in the case of an additional latching measure of this type, emergency release of the locking bolt 14 is, of course, provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A sealing strip for side windows on a motor vehicle, which sealing strip is arranged between a retractable, frameless, front side window and a retractable, frameless, rear side window and runs from a door line to a roof frame of the motor vehicle, wherein:
    a movable locking member is guided through a hollow cross section of the sealing strip toward and away from the roof frame; and
    in a closed state, the locking member engages with a locking counterpart arranged on the roof frame.

2. The sealing strip as claimed in claim 1, wherein the sealing strip is fastened to the rear side window on an edge which faces an edge of the front side window.

3. The sealing strip as claimed in claim 1, wherein the sealing strip is fastened to the front side window on an edge which faces an edge of the rear side window.

4. The sealing strip as claimed in claim 1, wherein the sealing strip has a U-profile for fastening the sealing strip to one of the two side windows.

5. The sealing strip as claimed in claim 3, wherein the sealing strip has, in its cross section, a limb to which a seal running along the sealing strip is fastened.

6. The sealing strip as claimed in claim 1, wherein the sealing strip has an H-profile which engages around the two side windows on respective edges thereof which face each other.

7. The sealing strip as claimed in claim 1, wherein the locking member comprises a locking pin running along the sealing strip.

8. The sealing strip as claimed in claim 2, wherein the locking member is a locking pin arranged in said hollow cross section of the sealing strip.

9. The sealing strip as claimed in claim 8, wherein the locking pin is movable along a longitudinal extent of the sealing strip.

10. The sealing strip as claimed in claim 7, wherein in the closed state, the locking pin engages in an opening in the roof frame.

11. The sealing strip as claimed in claim 1, wherein an automatic unlocking of the locking member takes place in the event of an accident, a failure of the vehicle power supply, or a malfunction of onboard electronics.

12. The sealing strip as claimed in claim 1, wherein locking of the locking member is performed by an electromagnetic or electropneumatic device.

13. A sealing strip for side windows on a motor vehicle, which sealing strip is arranged between a retractable, frameless, front side window and a retractable, frameless, rear side window and runs from a door line to a roof frame of the motor vehicle, wherein:
    a movable locking member is fitted to the sealing strip;
    in a closed state, the locking member engages with a locking counterpart arranged on the roof frame; and
    guide rails of the front side windows are retractable in a direction that angles toward the front of the vehicle, at an obtuse angle to the sealing strip.

14. A sealing strip for side windows on a motor vehicle, which sealing strip is arranged between a retractable, frameless, front side window and a retractable, frameless, rear side window and runs from a door line to a roof frame of the motor vehicle, wherein:
    a movable locking member is fitted to the sealing strip;
    in a closed state, the locking member engages with a locking counterpart arranged on the roof frame; and
    guide rails for retracting the rear side windows run in a direction that angles toward the rear of the vehicle, at an obtuse angle to the sealing strip.

15. A sealing apparatus for a vehicle having frameless front and rear retractable side windows, said sealing apparatus comprising:
    a sealing strip that is disposed between opposing edges of the front and rear windows in a closed state of said windows, and extends from a door line to a roof frame of the vehicle; and
    a movable locking member, which is guided through a hollow cross section of the sealing strip toward and away from the roof frame, and in a locked state engages with a locking structure on the roof frame.

16. A vehicle window arrangement comprising:
    frameless front and rear retractable windows which abut one another along respective edges thereof;
    a sealing strip that is disposed between said abutting edges in a closed state of said windows, and extends over the length of said abutting edges; and
    a movable locking member, which is guided through a hollow cross section of the sealing strip toward and away from a roof frame of the vehicle, and in a locked state engages with a locking structure on the roof frame.

17. The sealing apparatus according to claim 15, wherein said locking member comprises a locking pin that is movable along an interior of the sealing strip.

18. The sealing apparatus according to claim 16, wherein said locking member comprises a locking pin that is movable along an interior of the sealing strip.

19. The sealing apparatus according to claim 17, wherein, in a locked state, the locking pin engages in an opening of the roof frame.

20. The sealing apparatus according to claim 18, wherein, in a locked state, the locking pin engages in an opening of the roof frame.

* * * * *